US008596332B2

(12) United States Patent
Shikine et al.

(10) Patent No.: US 8,596,332 B2
(45) Date of Patent: Dec. 3, 2013

(54) SPEED SYNCHRONIZATION SYSTEM OF ALUMINUM ALLOY SLAB CONTINUOUS CASTING AND ROLLING LINE AND PRODUCTION FACILITY AND METHOD OF PRODUCTION OF ALUMINUM ALLOY CONTINUOUSLY CAST AND ROLLED SLAB USING SAME

(71) Applicant: Nippon Light Metal Company, Ltd., Tokyo (JP)

(72) Inventors: Isao Shikine, Shizuoka (JP); Kazumi Tono, Shizuoka (JP)

(73) Assignee: Nippon Light Metal Company, Ltd., Shinagawa-ku, Tokyo (JP)

( * ) Notice: Subject to any disclaimer, the term of this patent is extended or adjusted under 35 U.S.C. 154(b) by 0 days.

(21) Appl. No.: 13/678,043

(22) Filed: Nov. 15, 2012

(65) Prior Publication Data

US 2013/0068414 A1 Mar. 21, 2013

Related U.S. Application Data

(62) Division of application No. 12/096,275, filed as application No. PCT/JP2006/319618 on Sep. 25, 2006, now Pat. No. 8,342,232.

(30) Foreign Application Priority Data

Dec. 8, 2005 (JP) ................................. 2005-354610

(51) Int. Cl.
*B22D 11/16* (2006.01)
*B22D 11/06* (2006.01)

(52) U.S. Cl.
USPC ......... 164/413; 164/151.1; 164/431; 164/432

(58) Field of Classification Search
USPC ............... 164/4.1, 451–454, 151.1, 413, 481, 164/490, 432, 431
See application file for complete search history.

(56) References Cited

U.S. PATENT DOCUMENTS 4,134,440 A 1/1979 Kawawa
4,341,259 A 7/1982 Lauener
(Continued)

FOREIGN PATENT DOCUMENTS

| EP | 0 311 126 | 4/1989 |
| JP | 55-92220 | 7/1980 |
| JP | 58-218304 | 12/1983 |
| JP | 60196254 | 10/1985 |
| JP | 64-48609 | 2/1989 |
| JP | 06-285592 | 10/1994 |
| JP | 07314109 A | * 12/1995 |
| WO | WO 03004200 | 1/2003 |

OTHER PUBLICATIONS

English machine translation of abstract of JP 07314109 A.*

*Primary Examiner* — Kevin P Kerns
*Assistant Examiner* — Steven Ha
(74) *Attorney, Agent, or Firm* — Millen, White, Zelano & Branigan, P.C.

(57) ABSTRACT

The invention relates to a speed synchronization system for an aluminum alloy slab continuously casting and rolling line having a twin-belt casting machine and skin pass rolling machine which controls the belt speed of the twin-belt casting machine and roll speed of the skin pass rolling machine. An actually measured value of a slab speed during advance from a twin-belt casting machine to a skin pass rolling machine is compared with a line speed setting to control roll speed of the skin pass rolling machine by proportional/integrated control and simultaneously control belt speed of the twin-belt casting machine based on the line speed setting and a solidification shrinkage rate of the aluminum alloy to be cast.

20 Claims, 2 Drawing Sheets

(56) References Cited

U.S. PATENT DOCUMENTS

| | | |
|---|---|---|
| 4,597,048 A | 6/1986 | Mazur |
| 4,706,479 A | 11/1987 | Tominaga |
| 4,897,048 A | 1/1990 | Libon |
| 5,074,353 A | 12/1991 | Ohno |
| 5,113,678 A | 5/1992 | Mannaka |
| 5,887,645 A | 3/1999 | Rukavina |
| 7,418,992 B2 | 9/2008 | Pilavdzic |
| 2004/0012771 A1 | 1/2004 | Ehbets |

\* cited by examiner

SPEED SYNCHRONIZATION SYSTEM OF ALUMINUM ALLOY SLAB CONTINUOUS CASTING AND ROLLING LINE AND PRODUCTION FACILITY AND METHOD OF PRODUCTION OF ALUMINUM ALLOY CONTINUOUSLY CAST AND ROLLED SLAB USING SAME This application is a divisional of U.S. patent application Ser. No. 12/096,275, filed Jun. 5, 2008, which in turn is a U.S. National Stage Filing under 35 U.S.C. §371 of International Patent Application No. PCT/JP2006/319618, filed on Sep. 25, 2006, and claims the benefit of priority of Japanese Patent Application No. 2005-354610, filed Dec. 8, 2005.

TECHNICAL FIELD

The present invention relates to a speed synchronization system of an aluminum alloy slab continuous casting and rolling line having a twin-belt casting machine and a skin pass rolling machine and a production facility and method of production of an aluminum alloy continuously cast and rolled slab using the same.

BACKGROUND ART

The twin-belt casting method is a continuous casting method pouring a melt between two water cooled rotating belts facing each other in the vertical direction, cooling it from the outside surfaces of the belts to solidify the melt to form a slab, continuously pulling out the slab from the side of the assembly of the belts opposite to where the melt was poured, and taking it up in a coil.

In particular, in an aluminum alloy slab continuous casting and rolling line having a twin-belt casting machine and skin pass rolling machine, to obtain a sound aluminum alloy continuously cast and rolled slab, the belt speed of the twin-belt casting machine and the roll speed of the skin pass rolling machine have to be suitably controlled.

The structure of a casting machine for continuously casting an aluminum melt is described in the cooling guide system of a belt in continuous belt casting of a metal strip (Japanese National Publication (A) No. 2004-505774) and control of the heat flow of metal continuous casting (Japanese National Publication (A) No. 2004-508203). Japanese National Publication (A) No, 2004-505774 relates to a system and method for cooling and guiding a casting belt of a twin-belt casting machine, while Japanese National Publication (A) No. 2004-508203 relates to a method of casting a molten metal for producing an ingot for a casting metal strip while controlling the speed to eliminate heat to avoid surface defects and warping of the casting cavity. Neither Japanese National Publication (A) No. 2004-505774 nor Japanese National Publication (A) No. 2004-508203 has any description of speed control of a twin-belt casting machine and thin slab speed control at the outlet side.

On the other hand, regarding the speed of a continuous casting machine of a ferrous metal, for example Japanese Patent Publication (A) No. 54-39321 discloses a continuous casting method pouring molten steel from above a mold formed by a casting wheel rotating in a certain direction and a belt moving along part of its outer circumference in the same direction as the casting wheel and pulling out a cast strip from the bottom of the mold, the belt caster type continuous casting method for steel characterized by reducing the cast strip pullout speed to a speed of an extent where the melt surface at the rear end of the cast strip is solidified and no molten metal leaks from the rear end of the cast strip when the rear end of the cast strip reaches the inside of the mold. Further, Japanese Patent Publication (A) No. 59-24563 discloses a method of operating a continuous casting system comprising adjusting a pullout speed of a cast strip so that a speed of movement of the cast strip from a meniscus of molten steel in a mold to 150 mm in a height direction becomes within 2 seconds and thereby suitable for taking up a thin wide cast strip of only the sheet thickness into a coil shape and able to obtain a high quality cast strip with extremely few surface flaws and internal cracks. Japanese Patent Publication (A) No. 54-39321 and Japanese Patent Publication (A) No. 59-24563 disclose a method of control and a method of adjustment of the cast strip pullout speed, but do not disclose a method of control of the belt speed of the twin-belt casting machine and the roll speed of the hot rolling machine in the case of continuous hot rolling of a cast strip.

DISCLOSURE OF THE INVENTION

The present invention has as its object the provision of a speed synchronization system in an aluminum alloy slab continuous casting and rolling line having a twin-belt casting machine and skin pass rolling machine which suitably controls a belt speed of the twin-belt casting machine and roll speed of the skin pass rolling machine so as to obtain a sound aluminum alloy continuously cast and rolled slab and a production facility and method of production of an aluminum alloy continuously cast and rolled slab using the same.

To achieve the above object, according to the present invention, there is provided a speed synchronization system of an aluminum alloy slab continuous casting and rolling line having a twin-belt casting machine and a skin pass rolling machine, the aluminum alloy slab continuous casting and rolling line speed synchronization system characterized by providing a casting slab speed detecting means between the twin-belt casting machine and the skin pass rolling machine, comparing the slab speed calculated from the slab speed detecting means and a line speed setting, and controlling the roll speed of the skin pass rolling machine by proportional/integrated control and simultaneously calculating a suitable belt speed of the twin-belt casting machine from the line speed setting and a solidification shrinkage rate of the aluminum alloy so as to drive the belt drive system so as to thereby synchronize the roll speed of the skin pass rolling machine and the belt speed of the twin-belt casting machine.

Further, according to the present invention, there is provided an aluminum alloy slab production facility including a continuous casting and rolling line having a twin-belt casting machine and skin pass rolling machine, the production facility of an aluminum alloy continuously cast and rolled slab characterized by being provided with a continuous casting and rolling line speed synchronization system of the present invention.

Further, according to the present invention, there is provided a method of producing an aluminum alloy slab by a continuous casting and rolling line having a twin-belt casting machine and skin pass rolling machine, not having a rolling machine behind the skin pass rolling machine, and taking up the skin pass rolled slab directly by a coiler, the method of production of an aluminum alloy continuously cast and rolled slab characterized by using a continuous casting and rolling line speed synchronization system of the present invention.

The present invention (1) compares an actually measured value of a slab speed during advance from a twin-belt casting machine to a skin pass rolling machine with a line speed setting to control a roll speed of a skin pass rolling machine by proportional/integrated control and simultaneously (2) controls a belt speed of the twin-belt casting machine based on the line speed setting and a solidification shrinkage rate of the aluminum alloy to be cast so as to synchronize the belt speed of the twin-belt casting machine and the roll speed of the skin pass rolling machine, so can stably obtain a high quality continuously cast and rolled slab even with long term operation.

BEST MODE FOR WORKING THE INVENTION

The belt speed of the twin-belt casting machine and the roll speed of the skin pass rolling machine cannot be calculated for control only from the line speed set by the operator. The reason why is that the slab speed at the outlet side of the twin-belt casting machine is affected not only by the roll speed of the skin pass rolling machine, but also the reduction rate, slab alloy composition, slab temperature, type and amount of the rolling oil, coefficient of dynamic friction determined by the surface conditions of the slab and the surface condition of the rolls, and numerous other factors. In addition, an aluminum alloy changes in phase from a liquid to a solid inside the cavity of the twin-belt casting machine, but the rate of shrinkage due to solidification (volume solidification shrinkage rate) is a relatively large 6 to 7%. If controlling the belt speed and roll speed without considering this amount of shrinkage, the slab ends up cracking and it is not possible to obtain a defect-free continuously cast and rolled slab.

Therefore, the present invention comprises (1) providing a casting slab speed detecting means between the twin-belt casting machine and skin pass rolling machine, comparing the slab speed calculated from the slab speed detecting means with a line speed setting, and controlling the roll speed of the skin pass rolling machine by proportional/integrated control and simultaneously (2) calculating a suitable belt speed of the twin-belt casting machine from the line speed setting and a solidification shrinkage rate of the aluminum alloy so as to drive the belt drive system so as to thereby synchronize the roll speed of the skin pass rolling machine and the belt speed of the twin-belt casting machine.

Figure 1:
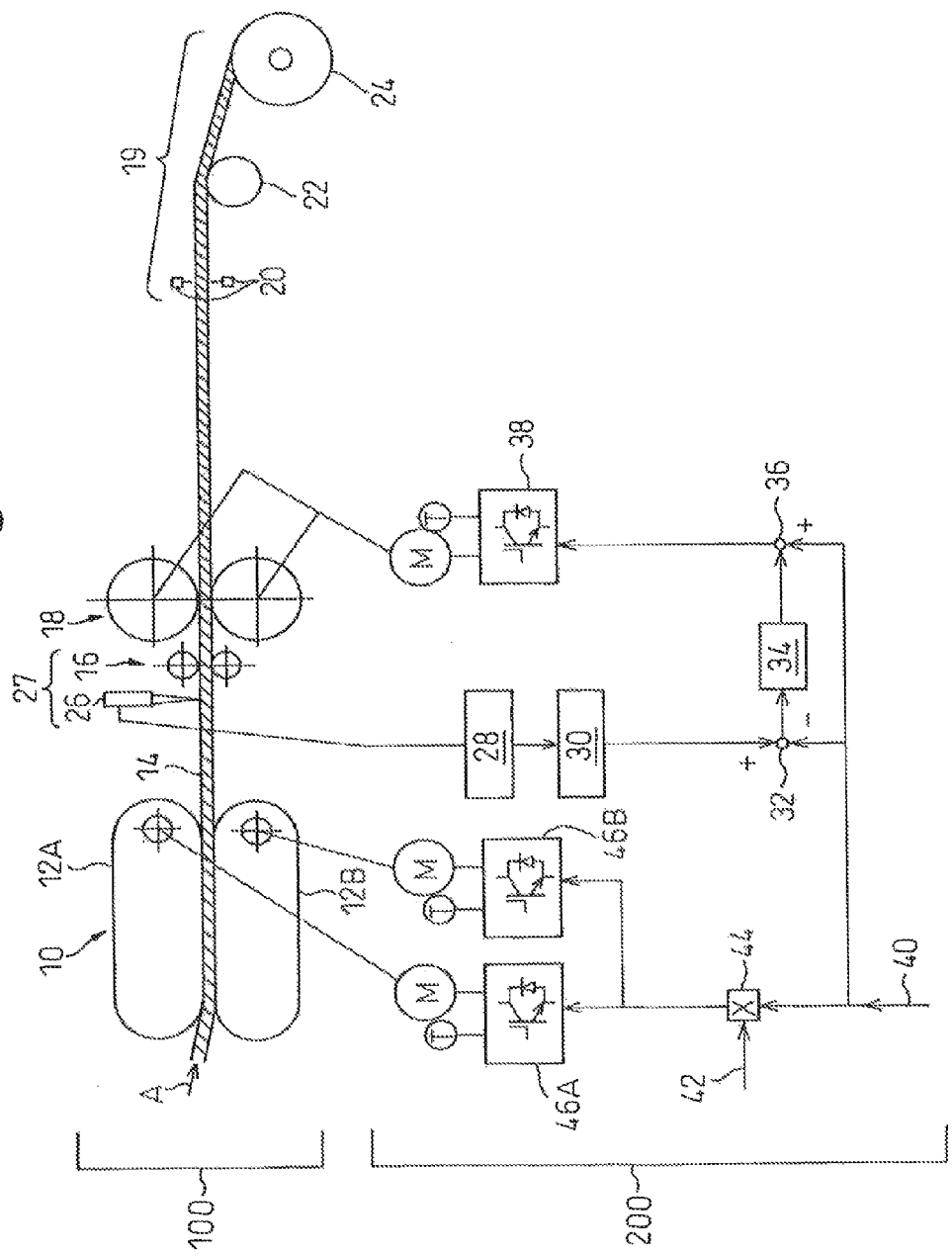
FIG. 1 is a view of the layout showing an example of an aluminum alloy slab production facility using a line speed synchronization system of the present invention.

FIG. 1 is a conceptual view of a system producing an aluminum alloy slab by using a line speed synchronization system of the present invention in a twin-belt continuous casting and rolling line.

The illustrated system is comprised of a twin-belt continuous casting and rolling line 100 and a control and drive system 200 of the same. The twin-belt continuous casting and rolling line 100 pours the melt A between the pair of water-cooled rotating belts 12A and 12B of the twin-belt continuous casting machine 10 from the left end of the continuous casting machine 10 to cause it to solidify between the belts and form a slab 14, pulls out the slab from the sides of the belts opposite to where the melt is poured (right end of continuous casting machine 10), runs it through the pinch rolls 16 and skin pass rolls 18, runs it through the edge trimmer (not shown), shearer 20, bridle roll (not shown), and deflector roll 22 of the group of rear facilities 19, and takes it up by a coiler 24.

The present invention is characterized by the provision between the twin-belt continuous casting machine 10 and the skin pass rolls 18 of a laser speed meter 26, pinch rolls 16, or other slab speed detecting means 27.

The control and drive system 200 according to the present invention, in one control and drive system, fetches the output of the casting slab speed detecting means 27 (in the illustrated example, the laser speed meter 26) through a converter 28 and filter 30 (in the figure, the + value), compares it by an adder 32 with line speed setting 40 (in the figure, − value), processes the results of comparison (that is, the slab actually measured speed—the line speed setting) by a PID controller 34, adds the results of processing at the adder 36 to the line speed setting 40, and uses the obtained control value to control a skin pass rolling machine drive system 38.

Simultaneously, the other control and drive system fetches a known solidification shrinkage coefficient 42 for the aluminum alloy to be cast, multiplies this coefficient 42 at a multiplier 44 with the line speed setting 40, and uses the obtained control value to control drive systems 46A, 46B of the pair of cooled rotating belts 12A, 12B of the twin-belt continuous casting machine 10.

Below, the configuration of the present invention will be explained in detail.

Twin-Belt Casting Machine 10

The twin-belt casting machine 10, as explained above, pours a melt A between water cooled rotating belts 12A and 12B facing each other in the vertical direction, cools it from the outside surfaces of the belts (outside in rotation) to solidify the melt A to form a slab 14, and continuously pulls out the slab 14 from the sides of the belts opposite to where the melt was poured.

At the sides of the belts opposite to the outside surfaces of the belts, that is, the casting machine body sides (inside of rotation), a plurality of cooling nozzles are provided at predetermined positions. During the casting, cooling water ejected from these plurality of nozzles forcibly cools the inside surfaces of the belts. By continuously pouring melt between the rotating belts, solidification starts from the surfaces of the melt contacting the belts in the cavity. Solidification is completed fully when the slab is pulled out from the sides of the belts opposite to where the melt was poured.

The range of the casting slab thickness cast by a twin-belt casting machine is preferably 5 to 30 mm. If the thickness is less than 5 mm, the amount of aluminum passing through the casting machine per unit time becomes too small and casting becomes difficult. Conversely, if the thickness is over 30 mm, the solidification rate at the center of the slab in the thickness direction becomes too slow and obtaining a high quality slab becomes difficult.

Skin Pass Rolling Mill 18

A skin pass rolling machine 18 is a rolling machine for passing a casting slab 14 through rotating rolls facing each other in the vertical direction to roll it by a light reduction rate of several percent or so.

By the skin pass rolling, the profile in the width direction of the slab 14 pulled out from the twin-belt casting machine 10 is flattened and, simultaneously, the effects of the change in slab tension due to operation of the edge trimmer (not shown), shearer 20, bridle roll (not shown), deflector roll 22, coiler 24, and other rear facilities 19 positioned behind the skin pass rolling machine 18 are blocked.

The casting slab speed at the outlet side of the twin-belt casting machine 10 is affected not only by the roll speed of the skin pass rolling machine 18, but also the reduction rate, slab alloy composition, slab temperature, type and amount of the rolling oil, the coefficient of dynamic friction determined by the surface conditions of the casting slab and the surface conditions of the roll, and numerous other factors.

The reduction rate of the casting slab 14 rolled by the skin pass rolling machine 18 is preferably 1 to 5%. If the reduction rate is less than 1%, when there is no hot rolling machine present as a rear facility 19 positioned behind the skin pass rolling machine 18, it becomes difficult to block the effects of the change in slab tension due to operation of an edge trimmer (not shown), shearer 20, bridle roll (not shown), deflector roll 22, coiler 24, etc. Conversely, if the reduction rate exceeds 5%, in the case of a type of alloy with a low casting slab rigidity, phenomena such as the deformation of the casting slab at the inlet side of the skin pass rolling machine occur and realization of the functions of the skin pass rolling machine 18 as a means for controlling the casting slab speed becomes difficult.

Slab Speed Detecting Means 27

In the present invention, the twin-belt casting machine 10 and the skin pass rolling machine 18 have a slab speed detecting means 27 provided between them. The slab speed detecting means 27 may be pinch rolls 16 or may be a laser speed meter 26. Alternatively, as the slab speed detecting means 27, a laser speed meter 26 and pinch rolls 16 may be jointly used. By employing a laser speed meter 26, it becomes possible to accurately measure the speed of the high temperature casting slab 14 by noncontact.

The laser speed meter 26 includes a single wavelength type laser speed meter and a two-wavelength type laser speed meter. Either laser speed meter may be used. At the present time, not only two-wavelength type lasers, but also single-wavelength laser speed meters having superior functions are commercially available. In the present invention, there is no need to limit the type of the laser speed meter.

Here, the measurement principle will be explained for the case when using a two-wavelength type laser speed meter. A two-wavelength type laser speed meter fires laser beams of two types of different wavelengths ($\lambda 1, \lambda 2$) at a certain speed at a moving object, measures the distance between interference fringes obtained from the reflected laser beams of the two types of different wavelengths ($\lambda 1', \lambda 2'$) reflected from the object, and calculates the speed of the object (relative speed between laser speed meter and object).

Figure 2:
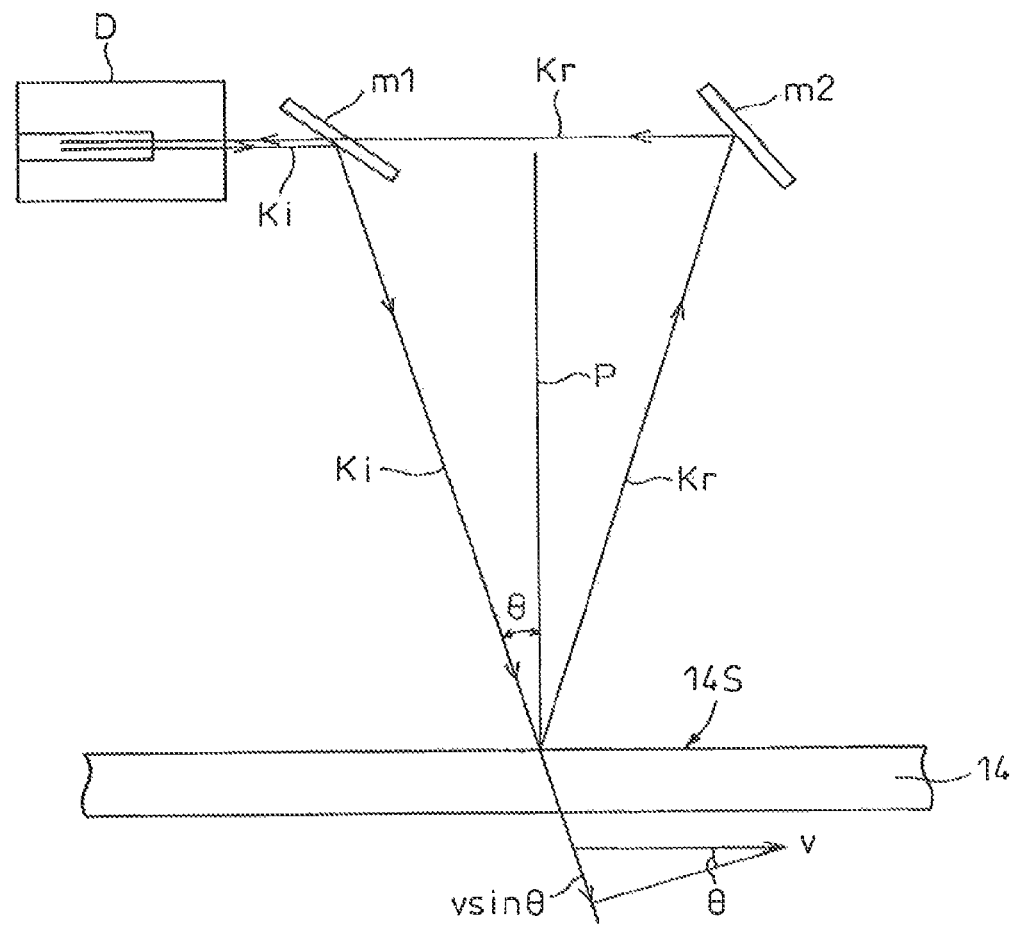
FIG. 2 is a cross-sectional view showing the parameters for detection of the slab speed by a laser.

FIG. 2 shows the parameters for detecting the slab speed by a laser. In the figure, to simplify the explanation, the case is shown where the component directions of the vectors of the laser beams Ki and the reflected laser beams Kr parallel to the casting slab surface 14s matches with the casting slab speed vector v direction. The laser beams Ki discharged from the firing and detection system 3 of the laser speed detector 26 are deflected downward by the half mirror m1 and focused on the surface 14s of the slab 14. The laser beams Kr reflected from the slab surface 14s are deflected by the mirror m2, pass through the half mirror m1 and are detected by the firing and detection system D.

The laser speed meter 26 is arranged so that the laser beams Ki focused on the casting slab 14 have an angle θ with respect to the direction P perpendicular to the slab surface. For example, the laser speed meter 26 is provided at a position 550 to 650 mm away from the casting slab surface 14s. The laser speed meter 26 may also be provided at either the top surface side or bottom surface side of the casting slab 14. Laser beams Ki (Ki1, Ki2) of two types of different wavelengths ($\lambda 1, \lambda 2$) are fired, but the Doupler effect arising due to the casting slab speed v causes the wavelengths of the reflected laser beams Kr (Kr1, Kr2) to shift to the long wavelength side as shown by the following equation 1 and the following equation 1 where the speed of light is c.

$$\lambda 1' = \lambda 1 \{1 - (v \times \sin \theta / c)\}^{-1} \quad \text{(equation 1)}$$

$$\lambda 2' = \lambda 2 \{1 - (v \times \sin \theta / c)\}^{-1} \quad \text{(equation 2)}$$

$\lambda 1'$: wavelength of reflected laser beam Kr1 corresponding to laser beam Ki1 of $\lambda 1$ wavelength
$\lambda 2'$: wavelength of reflected laser beam Kr2 corresponding to laser beam Ki2 of $\lambda 2$ wavelength
v: casting slab speed
θ: angle of laser beam with respect to direction perpendicular to slab surface
c: speed of light The distance L between interference fringes due to the two types of laser beams and the distance L' between interference fringes due to the two types of reflected laser beams Kr may be found by the following equations:

$$L = \lambda 1 \lambda 2 / (\lambda 1 - \lambda 2) \quad \text{(equation 3)}$$

$$\begin{aligned} L' &= \lambda 1' \lambda 2' / (\lambda 1' - \lambda 2') \quad \text{(equation 4)}\\ &= \{\lambda 1 \lambda 2 / (\lambda 1 - \lambda 2)\}\{1 - (V \times \sin \theta / c)\}^{-1} \end{aligned}$$

In the present invention, the twin-belt casting machine and skin pass rolling machine have a two-wavelength type laser speed meter provided between them in advance. $\lambda 1, \lambda 2$, and θ are known in advance, so by using a laser speed meter to measure the distance between the interference fringes of the reflected laser beams, it is possible to calculate the slab speed by equation 4

In the case of a two-wavelength type laser speed meter, as will be understood from equation 4, it is possible to set the wavelengths ($\lambda 1, \lambda 2$) of the laser beams in accordance with the application and easily secure a distance between interference fringes by the two types of reflected laser beams in the measurable range.

In the present invention, the casting slab speed is 2 to 15 m/min in range. This is sufficiently slow compared with the speed of light, so if using a two-wavelength type laser speed meter, it is possible to set the difference between the wavelengths ($\lambda 1, \lambda 2$) of the laser beams relatively large so as to secure a distance between interference fringes of the two types of reflected laser beams within the measurable range.

By employing a laser speed meter, it becomes possible to accurately measure the speed of a high temperature casting slab without contact.

To accurately measure the slab speed v on-line, it is preferable to prevent vibration of the slab so as to maintain a constant angle θ of the laser beams from the laser speed with respect to the direction perpendicular to the slab surface. Therefore, it is possible to use pinch rolls as a slab vibration preventing means so as to prevent vibration of the slab and maintain the angle θ constant and, when using a laser speed meter, enable more accurate on-line measurement of the slab speed.

Further, as explained above, it may also be considered to jointly use the laser speed meter 26 and the pinch rolls 16 as the slab speed detecting means. In this case, not only does the precision of measurement of the slab speed by the laser speed meter become higher, but also the pinch rolls function as a backup when the laser speed meter breaks down. The pinch rolls are provided with a DC motor (generator). A calibration line is prepared in advance so as to enable the value of the voltage generated by rotation of the pinch rolls to be converted to the slab speed. In this case, instead of the DC motor, it is possible to attach a high resolution pulse generator to the pinch rolls, count the pulses generated due to the number of rotations per unit time, and convert them to the casting slab speed.

Note that when jointly using a laser speed meter and pinch rolls, these are provided between the twin-belt casting machine and the skin pass rolling machine, but these may also be positioned so that one is in front or behind the line. The distance between the laser speed meter and pinch rolls at the line is preferably within 3 m so as to maintain a constant angle θ by prevention of vibration of the casting slab.

Converter 28 and Filter 30

The output from the laser speed meter 26 is a pulse signal, so the converter 28 converts this pulse signal to the number of pulses per unit time to digitalize it. Further, the digitalized signal is averaged by the filter 30 to remove the noise.

Proportional/Integrated Control 34 of Roll Speed of Skin Pass Rolling Machine

This compares the line speed setting signal 40 from the line speed setting control system adjusted by the operator and the casting slab speed signal digitalized by the converter 28 and the filter 30 to control the roll speed of the skin pass rolling machine 18 by proportional/integrated control. By this proportional/integrated control, smooth and fast control of the roll speed of the skin pass rolling machine becomes possible.

In a usual rolling machine, the rolling roll speed is not corrected. The general practice has been to correct the speed of the auxiliary rolls at the front and rear. In a usual rolling machine, if positively correcting the rolling roll speed so as to keep the strip speed constant etc., the coefficient of dynamic friction of the contact surfaces with the rolled material will fluctuate and cause changes in the reduction rate, that is, fluctuations in the sheet thickness, so the speed of the rolling rolls is preferably constant. In the present invention, by optimally adjusting the amount of proportional correction and the amount of integrated correction with respect to the speed error, it becomes possible to stably correct the speed of the rolling rolls without changing the reduction rate.

In this way, in the present invention, proportional/integrated control, that is, proportional control and integrated control, are simultaneously performed. With simple ON/OFF control, the change in the amount of operation is too large and the actual target value is repeatedly exceeded, so hunting is repeated near the target value in the control. To compensate for this defect, there is the control method of making the amount of operation a magnitude proportional to the difference between the target value and the current value for gradual adjustment, that is, proportional control. According to proportional control, the target value is approached, but the amount of operation becomes too small and ends up stabilizing in a state extremely close to the target value and the current value never reaches the target value. To compensate for this defect, there is the control method of cumulatively adding the residual error between the target value and the current value over time and, when it reaches a certain magnitude, increasing the amount of operation to eliminate the error, that is, integrated control.

The present invention compares the line speed setting (target value) and the casting slab speed (current value) and makes the amount of operation of the roll speed of the skin pass rolling machine a magnitude proportional to the difference to gradually make the roll speed approach the line speed setting (target value). Further, it cumulatively adds the residual error between the casting slab speed (current value) and the line speed setting (target value) over time and, when reaching a certain magnitude, increases the amount of operation to eliminate the error.

In this proportional/integrated control, it is possible to optimally adjust the amount of proportional control and the amount of integrated control with respect to the speed error so as to stably correct the speed of the rolling rolls without changing the reduction rate.

Control of Belt Speed of Twin-Belt Casting Machine

An aluminum alloy changes in phase from a liquid to a solid (that is, solidifies) inside the cavity of the twin-belt casting machine, but the rate of shrinkage due to solidification (volume solidification shrinkage rate) is a relatively large 6 to 7%. If controlling the belt speed and roll speed without considering this amount of shrinkage, tensile stress accompanying solidification shrinkage occurs in the casting direction of the casting slab and the slab ends up cracking.

Therefore, the suitable belt speed is calculated considering the coefficient $\{1-(1-\Delta Vs)^{1/3}\}$ for correcting the linear shrinkage (shrinkage in casting direction) accompanying the solidification shrinkage of the aluminum alloy at the line speed setting adjusted by the operator. Based on this corrected belt speed signal, the belt drive system (motor) is driven and the upper and lower belts of the belt-type casting machine rotate at a suitable speed.

$$V_B = V_O \times [1 + \{1-(1-\Delta Vs)^{1/3}\}]$$

$V_O$: line speed setting $V_B$: belt speed $\Delta Vs$: solidification volume shrinkage rate of aluminum alloy Normally, 0.06 is used as the solidification volume shrinkage rate of an aluminum alloy, but this value may be changed and $V_B$ calculated in accordance with the type of the alloy. Incidentally, when $\Delta Vs$ is 0.06, the belt speed becomes a speed of approximately 102% of the line speed setting. As the setting for $\Delta Vs$, 0.04 to 0.08 in range is suitable. If the $\Delta Vs$ is less than 0.04, the possibility rises of casting slab cracks being caused, while if $\Delta Vs$ is over 0.08, this becomes a factor causing warping of the casting slab.

By calculating the suitable belt speed of the twin-belt casting machine from the line speed setting and the solidification shrinkage rate of the aluminum alloy slab to drive the belt drive system, it becomes possible to obtain a continuous casting slab free of casting defects.

Slab Continuous Casting and Rolling Line

In FIG. 1, the cavity of the twin-belt casting machine is set in the horizontal direction, but it may also be tilted downward in the direction from the melt inlet side to the slab outlet side. That is, the casting slab between the twin-belt casting machine and the skin pass rolling machine does not have to have a slab surface parallel, to the horizontal plane. Further, the cavity of the twin-belt casting machine may be set in the vertical direction. Even if the twin-belt casting machine and the skin pass rolling machine are arranged in this way and the pinch rolls, laser speed meter, etc. are set to match with this, the speed synchronization system similarly functions.

In a continuous casting and rolling line, the facilities from the skin pass rolling machine on, the so-called rear facilities, are not particularly limited. For example, the rear facilities may be facilities provided with 4H tandem hot rolling machines and systems with no rolling machines and with skin pass rolled slabs taken up directly by coilers.

Industrial Applicability

The present invention (1) compares an actually measured value of a slab speed during advance from a twin-belt casting machine to a skin pass rolling machine with a line speed setting to control a roll speed of a skin pass rolling machine by proportional/integrated control and simultaneously (2) controls a belt speed of the twin-belt casting machine based on the line speed setting and a solidification shrinkage rate of the aluminum alloy to be cast so as to synchronize the belt speed of the twin-belt casting machine and the roll speed of the skin pass rolling machine, so can stably obtain a high quality continuously cast and rolled slab even with long term operation.

The invention claimed is:

1. A speed synchronization system for an aluminum alloy slab continuous casting and rolling line having a twin-belt casting machine and a skin pass rolling machine, said aluminum alloy slab continuous casting and rolling line speed synchronization system comprising
a casting slab speed detecting means positioned between a twin-belt casting machine and a skin pass rolling machine for detecting the cast slab speed, said casting slab speed detecting means comprising pinch rolls, a laser speed meter, or the combination of pinch rolls and a laser speed meter, and
a control and drive system comprising:
means for comparing cast slab speed with a line speed setting to obtain a difference and to cumulatively add the difference between the cast slab speed and the line speed setting to calculate a residual error,
means for controlling the roll speed of the skin pass rolling machine by proportional and integrated control in response to said difference and residual error so as to correct the speed of the skin pass rolling machine without changing the reduction rate, and
means for simultaneously calculating a suitable belt speed for the twin-belt casting machine from said line speed setting and a solidification shrinkage rate of the aluminum alloy slab so as to drive the belt drive system so as to thereby synchronize the roll speed of the skin pass rolling machine and the belt speed of the twin-belt casting machine.

2. A speed synchronization system as set forth in claim 1, wherein a laser speed meter is used as said casting slab speed detecting means, and pinch rolls are used as a casting slab vibration preventing means.

3. A speed synchronization system for an aluminum alloy slab continuous casting and rolling line having a twin-belt casting machine and a skin pass rolling machine, said speed synchronization system comprising:
a slab speed detecting means positioned between a twin-belt casting machine and a skin pass rolling machine, wherein said slab speed detecting means measures the speed of a continuously cast aluminum alloy slab produced by the twin-belt casting machine, said slab speed detecting means comprises pinch rolls, a laser speed meter, or the combination of pinch rolls and a laser speed meter, and
a control and drive system means for comparing the speed of the continuously cast aluminum alloy slab measured by said slab speed detecting means with a line speed setting, processing the results of the comparison in a proportional and integrated controller, adding the results of said processing to the line speed setting, and using the obtained value to control the drive system of the skin pass rolling machine.

4. The speed synchronization system according to claim 3, wherein said slab speed detecting means is a laser speed meter, and said system further comprises pinch rolls used as a casting slab vibration preventing means.

5. The speed synchronization system according to claim 3, wherein said slab speed detecting means is a laser speed meter, and said laser speed meter is a single wavelength speed meter.

6. The speed synchronization system according to claim 3, wherein said slab speed detecting means is a laser speed meter, and said laser speed meter is a two-wavelength speed meter.

7. The speed synchronization system according to claim 3, wherein said slab speed detecting means is a pair of pinch rolls.

8. The speed synchronization system according to claim 3, wherein said slab speed detecting means is a laser speed meter and a pair of pinch rolls.

9. The speed synchronization system according to claim 3, wherein said skin pass rolling machine is a pair of skin pass rolls.

10. The speed synchronization system according to claim 3, wherein said control and drive system means provides proportional control by changing the speed of the skin pass rolling machine by an amount proportional to the difference between the line speed setting and the slab speed to gradually make the speed of the skin pass rolling machine approach the line speed setting, and provides integrated control by cumulatively adding the residual error between the casting slab speed and the line speed setting over time and, when the cumulatively adding residual error reaches a set magnitude, adjusting the speed of the skin pass rolling machine to eliminate the error.

11. A speed synchronization system as set forth in claim 1, wherein said means for comparing cast slab speed with a line speed setting comprises a converter and filter for receiving output from said casting slab speed detecting means, and an adder for comparing the cast slab speed with the line speed setting.

12. A speed synchronization system as set forth in claim 1, wherein said means for controlling the roll speed of the skin pass rolling machine comprises a PID controller for processing the results of the comparison from the adder, and means for adding the results of the processing to the line speed setting to obtain a control value and sending said control value to the drive system of the skin pass rolling machine.

13. A speed synchronization system as set forth in claim 11, wherein said means for controlling the roll speed of the skin pass rolling machine comprises a PID controller for processing the results of the comparison from the adder, and means for adding the results of the processing to the line speed setting to obtain a control value and sending said control value to the drive system of the skin pass rolling machine.

14. A speed synchronization system as set forth in claim 1, wherein said means for simultaneously calculating a suitable belt speed for the twin-belt casting machine comprises a multiplier for multiplying a solidification shrinkage rate of the aluminum alloy slab with the line speed setting and sending the resultant control value to control drive systems for rotating the belts of the twin-belt casting machine.

15. A speed synchronization system as set forth in claim 13, wherein said means for simultaneously calculating a suitable belt speed for the twin-belt casting machine comprises a multiplier for multiplying a solidification shrinkage rate of the aluminum alloy slab with the line speed setting and sending the resultant control value to control drive systems for rotating the belts of the twin-belt casting machine.

16. A speed synchronization system as set forth in claim 11, wherein said converter receives a pulse signal from said casting slab speed detecting means and converts the pulse signal to the number of pulses per unit time to digitize the signal, and said filter averages the digitized signal to remove noise.

17. A speed synchronization system as set forth in claim 12, wherein said PID controller processes the results of the comparison from the adder by calculating a value proportional to the difference between the cast slab speed and the line speed setting to provide proportional control, and by cumulatively adding the residual error between the line speed setting and the current cast slab speed over time and, when the cumulatively added residual error reaches a set magnitude, adjusting the speed of the skin pass rolling machine to eliminate the error to provide integrated control.

18. The speed synchronization system according to claim 1, wherein said slab speed detecting means is a laser speed meter.

19. The speed synchronization system according to claim 1, wherein said slab speed detecting means is a pair of pinch rolls.

20. The speed synchronization system according to claim 1, wherein said slab speed detecting means is a laser speed meter and a pair of pinch rolls.

* * * * *